United States Patent [19]

Smith

[11] Patent Number: 5,280,892
[45] Date of Patent: Jan. 25, 1994

[54] POSITIONING FIXTURE FOR WELDING OPERATIONS

[76] Inventor: Dresden G. Smith, 1621 English Dr., San Jose, Calif. 95129

[21] Appl. No.: 634,565

[22] Filed: Dec. 27, 1990

[51] Int. Cl.⁵ .............................................. B23Q 1/04
[52] U.S. Cl. ........................................ 269/75; 269/96; 269/45; 269/82
[58] Field of Search ............... 269/45, 37, 40, 41, 269/44, 22, 24, 27, 29, 31, 33, 82-85, 96, 75

[56] References Cited

U.S. PATENT DOCUMENTS

| | | | |
|---|---|---|---|
| 4,196,518 | 4/1980 | Benzaria | 433/60 |
| 4,515,333 | 5/1985 | Pugh et al. | 248/122 |
| 4,557,623 | 12/1985 | Tella | 403/31 |
| 4,702,465 | 10/1987 | McConnell | 269/328 |
| 4,767,231 | 8/1988 | Wallis | 403/56 |
| 4,834,519 | 5/1989 | Twisselmann | 359/384 |

FOREIGN PATENT DOCUMENTS

621825 7/1976 U.S.S.R. .

Primary Examiner—Robert C. Watson
Assistant Examiner—Eileen P. Morgan
Attorney, Agent, or Firm—Robert Charles Hill

[57] ABSTRACT

A positioning fixture assembly including tubular sections joined end to end by articulated joints but having one end articulated to a mounting assembly attached to a work surface, and a second end articulated to a tool holder, via articulated joints. The mounting assembly is attached to a work surface. The toolholder is attached to a vise grip pliers or similar tool for holding a small part to be welded to a larger part positioned on the table. The joints are locked by spring force, and are unlocked by applying pneumatic pressure via a foot pedal.

14 Claims, 8 Drawing Sheets

POSITIONING FIXTURE FOR WELDING OPERATIONS

FIELD OF THE INVENTION

This invention relates to positioning fixtures of the type having one end fixed to a work surface and another end to which an item may be attached thereby securing the item in an arbitrary position such as required for welding, etc. and particularly to a positioning fixture having joints which may be locked in an arbitrary position or unlocked for repositioning by convenient depression of a foot pedal.

BACKGROUND OF THE INVENTION AND INFORMATION DISCLOSURE

Frequently there arises a need to weld a small part to a larger part at an acute angle. Unless hard tooling is available, it is difficult to support the smaller part in the desired position until the joint is tack-welded. The usual manner of doing this is to clamp the smaller part to a piece of angle iron or such in order to hold the part in position. Often, no suitable configuration of supporting structure is available in the shop.

There are numerous types of clamps commercially available for clamping parts in position for welding. For example, there is a holding device available consisting of two magnets connected by a link. The magnets can swivel on parallel axes at each end of the link to allow the base of the magnets to be oriented at an acute or obtuse angle to each other in one plane. Neither the clamps nor the magnet assembly allows for accurate positioning and positive holding of a small part which must be supported at an angle between two planes.

The patent literature discloses a variety of adjustable joints used in positioning fixtures.

U.S. Pat. No. 4,196,518 issued to Benzaria disclosed a double ball-and-socket joint used to support dental bridge molds wherein both joints are simultaneously locked and unlocked with a single lever.

U.S. Pat. No. 4,515,333 issued to Pugh disclosed an adjustable support for instruments used in microsurgery. The ball of a ball joint is nested within clamping rings which are forced by springs against the surface of the ball to lock the ball in a desired position. The clamps are forced apart by air pressure to release the ball. An extension on one side of the ball supports an instrument while an opposite extension supports a counter balancing weight. The presence of the counterweight would interfere with the freedom of positioning that is required in applications intended for the present invention.

U.S. Pat. No. 4,767,231 issued to Wallis disclosed a method of providing an adjustable joint between two intermediate sections which utilizes dual ball-and-socket joints provided with a means for manually locking the joint. U.S. Pat. No. 4,557,623 issued to Tella disclosed a robotic wrist joint which utilizes two hemispherical elements located in opposite ends of a cylindrical enclosure. The mounting stems of the hemispherical elements are attached to a robot arm and to a work holder respectively. The joint is free to articulate in the nominal condition. Supplying air pressure to one port on the cylindrical body causes the joint to align the stems of the hemispherical elements to a common centerline. Supplying air pressure to a second port on the body causes the joint to rigidly lock.

U.S. Pat. No. 4,702,465 issued to McConnell disclosed a ball joint suitable for positioning an Extremity Support mounted on a hospital operating table. The joint is slidably mounted on a support bar providing that the joint can be positioned at arbitrary locations along the length of the table. The joint is normally held in the locked condition by a spring and unlocked by pressing on a foot pedal.

U.S. Pat. No. 4,834,519 issued to Twisselmann, disclosed a ball joint suitable for positioning surgery microscopes. The joint is nominally held in the locked condition by a spring and manually released by pressing on a lever.

INTERNATIONAL PATENTS

East German Patent 219,145 issued to Kuhlfluck disclosed a ball joint employed in a gripper used to handle randomly positioned workpieces. The joint is thrust forward from its mount by applying air pressure to the mounting stem. The air pressure also actuates a detent operating on a diameter of the ball to urge the joint to assume a predetermined position.

U.S.S.R. Patent 619,702 issued to Epishin disclosed a spherical ball joint which is held in the locked condition by forcing a ram against the ball by a spring. The joint is substantially released by porting air pressure into the ram plenum, thus forcing a piston to move away from the ram and compressing the spring. The joint is not completely released by the air pressure because a small diameter stem projecting from the base of the ram is exposed to the air pressure.

None of the inventions discussed in the foregoing paragraphs addresses the problem of holding a small part firmly and in an arbitrary position such as is required in welding operations.

THE INVENTION

OBJECTS

It is an object of this invention to provide a secure positioning fixture for supporting a part in an arbitrary location and orientation such as required to weld a part to another part.

It is another object that the range of location and orientation as well as the rigidity of the support be substantially greater than is provided by jigs and fixtures of the prior art.

It is another object that the positioning fixture be adaptable to the typical workplace such as attachment to the top of a welding table via an articulated joint and a workpiece clamping means attached to the opposite end of the fixture via another articulated joint.

It is a further object that the positioning fixture include joints that are locked when the worker performs the intended operation on the part, but which are conveniently unlocked, such as by depression of a foot pedal, thereby permitting use of both hands when the worker desires to reposition or release the part.

It is yet another object that the fixture be constructed according to a design that avoids damage due to weld spatter such as occurs with pneumatic lines exposed to a welding operation.

A further embodiment of the invention features successive individual unlocking of the joints in order to facilitate repositioning of the part.

SUMMARY

This invention is directed toward a positioning fixture comprising tubular arm sections joined end to end but having one end articulated to the top of a work bench and another end articulated to a workpiece holder such as vise grip pliers.

In one embodiment the fixture consists of two sections connected by an intermediate joint, the intermediate joint allowing motion in one plane. The following discussion pertains to a fixture with two sections, with the understanding that the same principles of joint construction and communication of air passage between joints applies to embodiments having one or two or more sections.

In a preferred embodiment, the joint connecting an end of tubular section the first tube to the mounting assembly provides for the section to rotate within two degrees of freedom. One degree of freedom is "longitudinal" in which the tube gyrates longitudinally about the vertical axis (perpendicular to the table top). The second degree of freedom is latitudinal defined by the latitudinal angle between the vertical axis and the axis of the tubular section.

In one embodiment (discussed in detail subsequently) the joint between the first and second sections allows only relative movement between the two sections in a vertical plane. At the far end of the second section (adjacent to the tool holder), the third joint is arranged to allow universal movement of the shaft supporting the tool holder within a 15 degree cone plus 90 degree movement in one plane. This arrangement allows the tool holder to be positioned upward, or downward, or sideways, and allows the toolholder to be rotated about a line passing through the center of the joint. Additionally, the toolholder mounting assembly allows the toolholder to be positioned in any orientation desired, thus providing extreme freedom for locating and orienting a locking-type pliers clamped in the toolholder.

The tubular construction encloses air lines which provide connecting air passages between the joints. This construction thereby permits the operator to pneumatically unlock all joints simultaneously by actuating a foot pedal while allowing him to have both hands available to position the workpiece. The tubular construction is very resistant to damage caused by "weld spatter" in contrast to systems using exposed flexible hoses for air passages.

Additionally, the base is electrically insulated from the rest of the fixture so that electric current cannot flow from an arc welder electrode through the fixture to the table and thereby damage the joints.

DESCRIPTION OF THE PREFERRED EMBODIMENT

The following detailed description illustrates the invention by way of example and not by way of limitation of the principles of the invention. This description will clearly enable one skilled in the art to make and use the invention and suggests several embodiments, adaptations, and variations.

Figure 1:
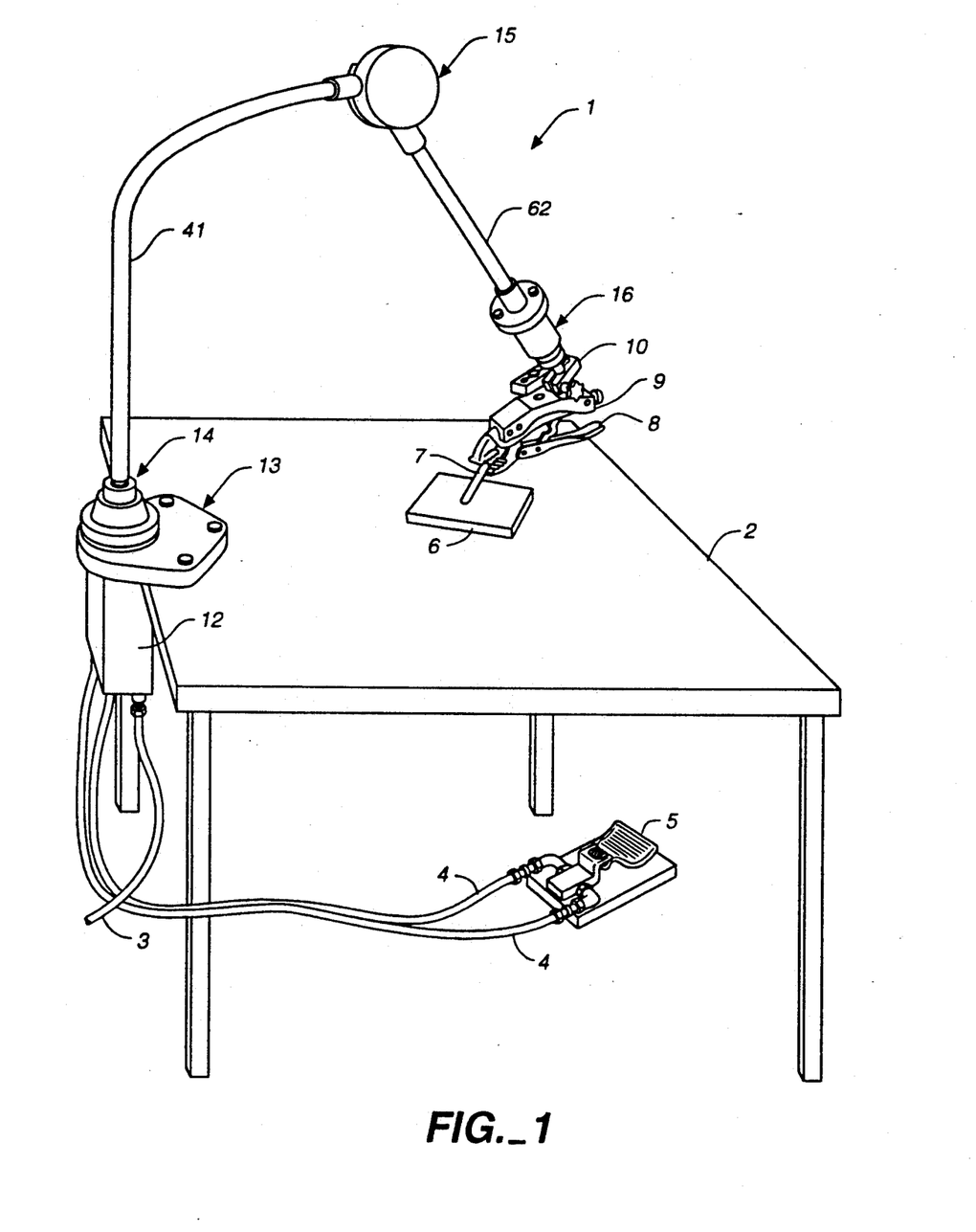
FIG. 1 is an isometric view of the positioning fixture mounted to a work surface and showing the pneumatic supply line connected to the base assembly. The foot pedal used to unlock the joints is shown along with the hoses connecting the foot pedal to the base assembly. Also shown is a large workpiece on the table and a smaller workpiece supported in the pliers.

Referring to the drawings and particularly to FIG. 1, the positioning fixture 1 (hereinafter referred to as the "fixture") is shown mounted onto a work table 2. An air supply line 3 is connected to the fixture 1. Dual air hoses 4 lead from the fixture 1 to the foot pedal 5. A small workpiece 7 is engaged by the pliers 8. The pliers 8 are attached to a toolholder 9 which is in turn attached to a clamp assembly 10. The clamp assembly 10 is attached to the third joint 16 of the fixture 1.

In a welding operation the operator positions the large work piece 6 upon the table 2 in a preferred location for easy welding. The small workpiece 7 is clamped into the pliers 8 and the clamp assembly 10 is articulated to position the small workpiece 7 in the approximate preferred orientation. The operator then grasps the toolholder 9 and depresses the foot pedal valve 5 which unlocks all of the joints in the fixture 1. The small workpiece 7 may then be moved into the desired location and oriented with respect to the large workpiece 6. When the small workpiece 7 is thus located, the operator releases the foot pedal 5 and tightens the clamp assembly 10. The small workpiece 7 may then be tack-welded to the large workpiece 6.

Construction and operation of the fixture 1 are described in greater detail below.

Figure 2:
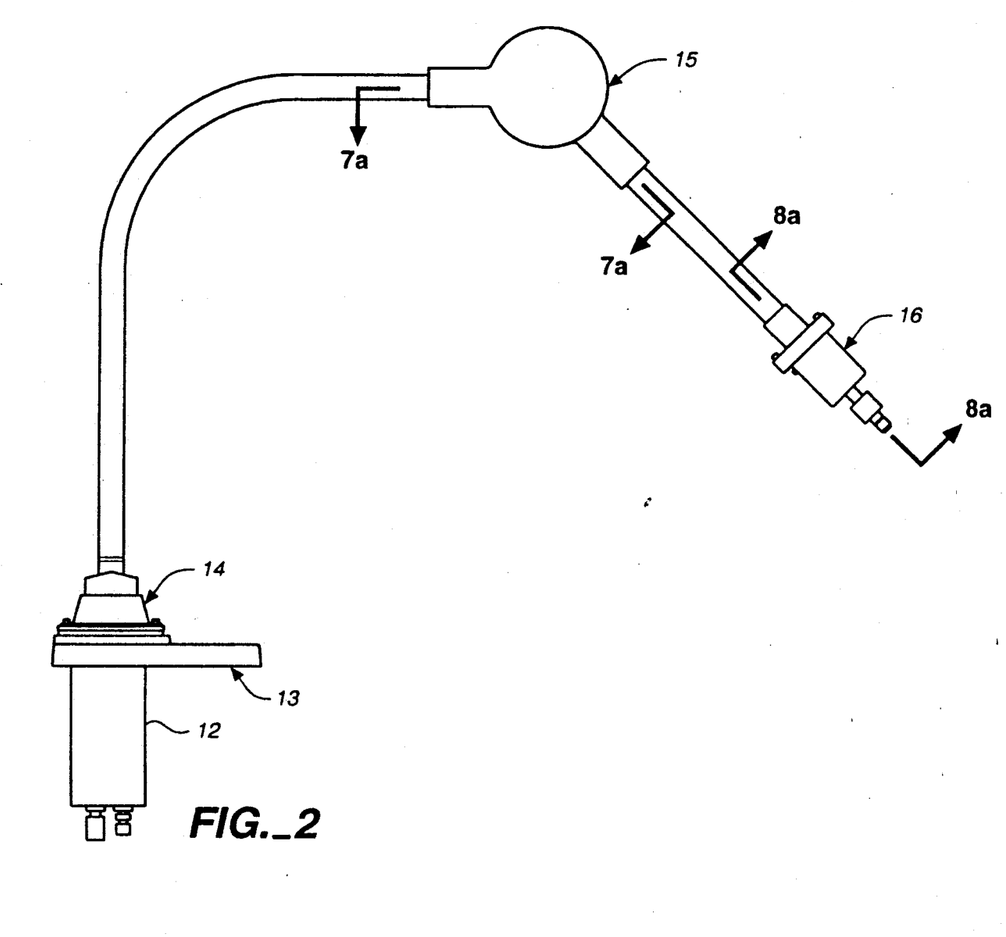
FIG. 2 is a side-view of the fixture showing lines-of-sight for the cross sectional views presented in FIGS. 7 and 8.

FIG. 2 shows a side view of the fixture. "Line-of-sight" 7a in FIG. 2 indicates the section view shown in FIG. 7. The flat horizontal portion of the base housing 13 of the fixture is adapted to be bolted to the worktable.

Figure 3:
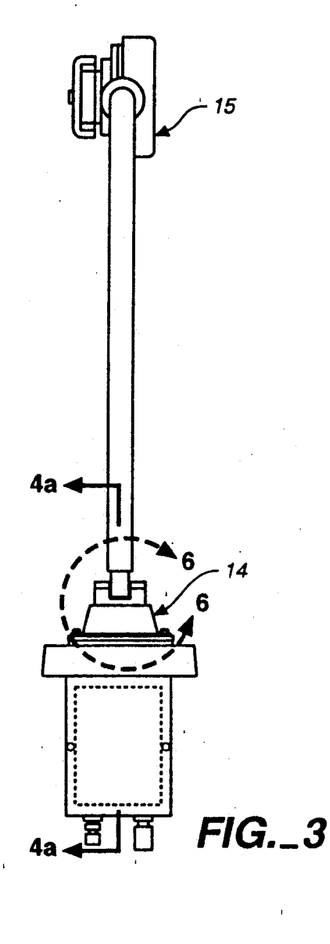
FIG. 3 is a rear view of the fixture.
Figure 4:
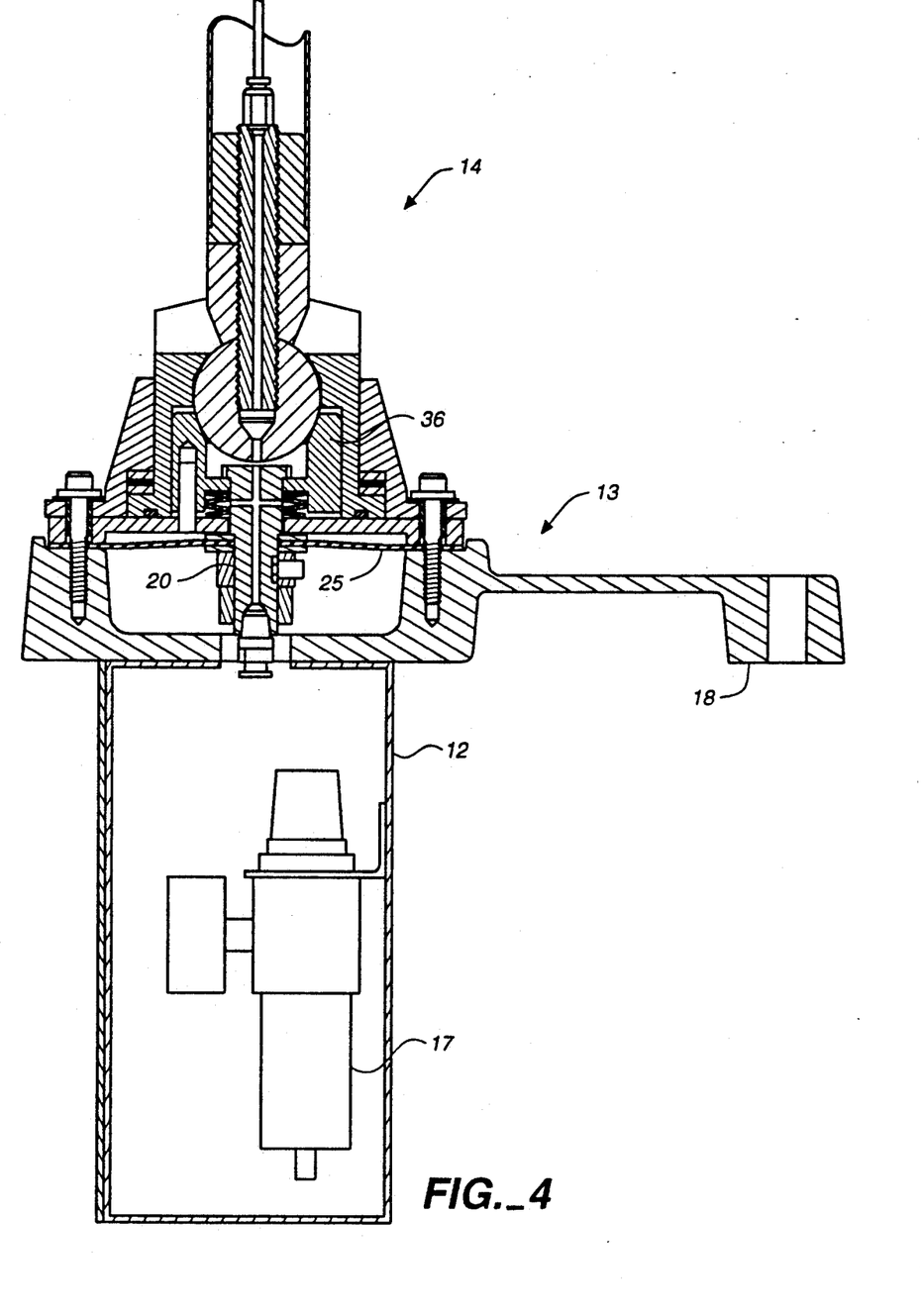
FIG. 4 is a cross section of the base assembly of the fixture showing the first joint, the base construction, and a box enclosing a pneumatic filter/regulator.

FIG. 3 is a rear view of the fixture indicating line-of-sight 4a through the center of the base housing for the sectional view shown in FIG. 4. Additionally, a zone is indicated for a view of the ball joint shown in FIG. 6.

FIG. 4 is a vertical section of the base housing showing the relative positions of the base 18, the box 12, and the filter/regulator 17. An embodiment of a piston assembly means is shown which includes a piston assembly 36 connected to a diaphragm 25 by a stud 20.

Figure 5:
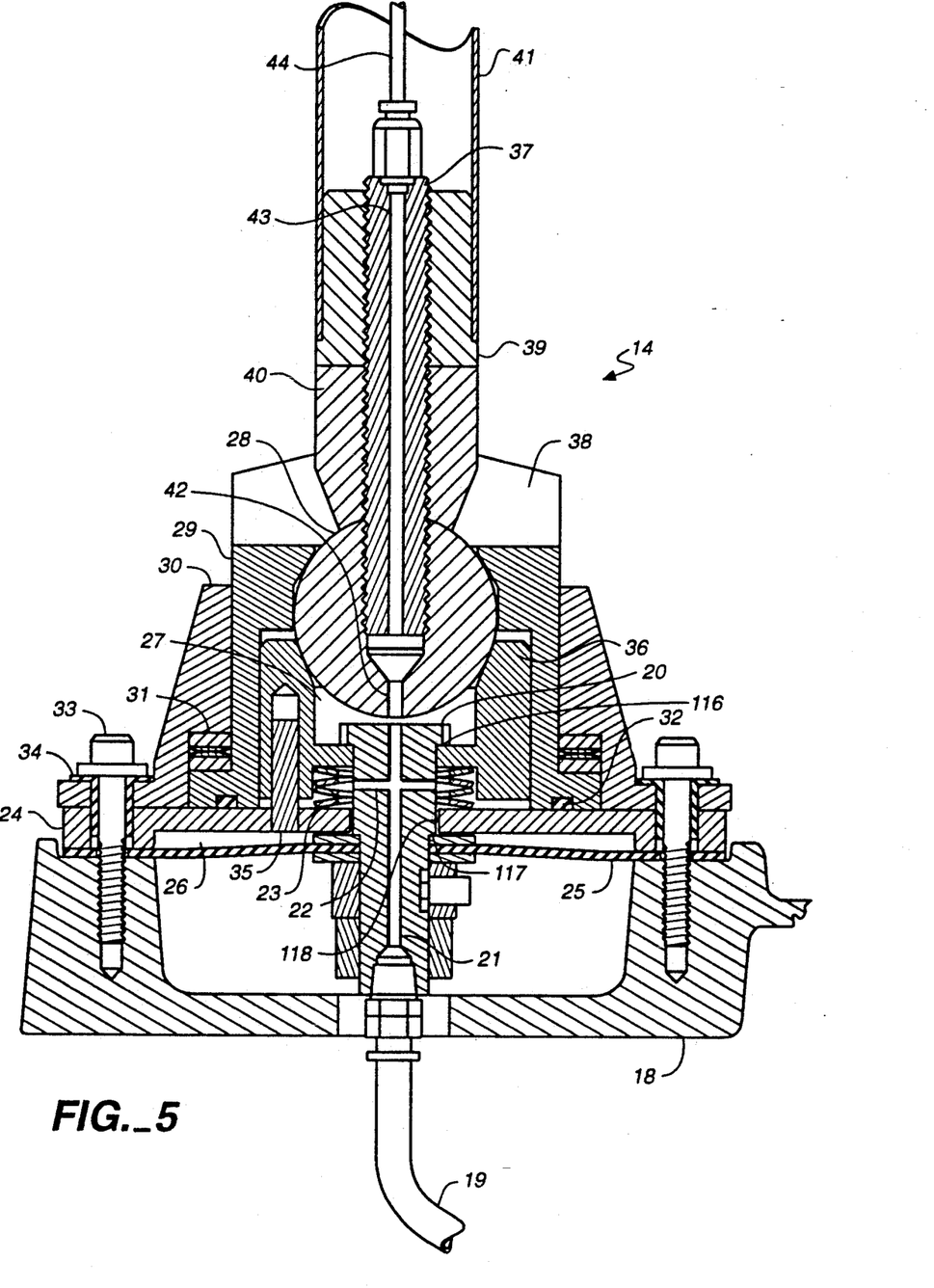
FIG. 5 is an enlarged view of the cross section of the first joint.

FIG. 5 is an expanded sectional view of the upper portion of the base housing 13. shown in FIG. 4. Referring to FIG. 5, the entire fixture assembly is mounted by base housing 13 housing 13, including base housing 13 section 18 onto the work table 2 shown in FIG. 1. Additionally the base housing 13, including base section 18, is a mounting fixture for the pneumatic components (filter/regulator 17) and their enclosing box 12 per FIG. 4. The construction of the first joint 14 is shown in detail in FIG. 5. The ball 28 is retained by retainer 29 and clamped in a fixed position by contact with the upper surface of a piston assembly 36. Piston assembly 36 is urged in an upward direction towards the ball 28 by the spring 23 which tends to force the piston assembly 36 away from the fixed plate 24. The base housing includes a plate 24 bolted to a base section 18. A diaphragm 25 made of flexible material is positioned between the plate 24 and the base section 18, thereby dividing the cavity within the base housing into an upper plenum 26 and a lower section which communicates with the ambient environment. A stud 20 has one shoulder engaging piston assembly 36 and another shoulder 117 engaging diaphragm 25 so that the diaphragm 25 may pull the piston assembly 36 in a downward direction and compress the spring 23. In operation, air pressure is conveyed to the lower end, 20, of the piston assembly via the flexible tube 19. Air pressure is conducted to plenum 27 at the upper side of the piston assembly 36 via the hole 21 running along the centerline of the piston assembly 20. At the same time air pressure is transmitted through the transverse hole 22 in the lower end 20 of the piston assembly to the plenum occupied by spring 23, thence through the clearance hole 118 for the piston assembly in plate 24, and thence into plenum 26 above the diaphragm 25. When the plenum 26 is pressurized the diaphragm 25 will move in downward direction, and thus compress the spring 23 and unclamp the ball 28.

The force of the piston assembly 36 against the ball 28 tends to move the ball 28 and its retainer 29 in an upward direction. When air pressure is supplied to the system the piston 36 ceases to bear against the ball 28, but ball 28 continues to bear against retainer 29 because of the air pressure. In order to retain the retainer in its proper position and allow it to rotate about its vertical centerline, flange 30 constrains the retainer 29 laterally and axially. Flange 30 is clamped to the plate 24 and base 18 via screw 33.

Flange 30 and plate 24 are electrically insulated from base 18 via the diaphragm 25 and the insulator 34. This feature prevents welding current from being conducted through the fixture 1 to the table 2.

Piston assembly 36 is prevented from rotating about its centerline at all times by pin 35 which is pressed into piston assembly 36 and slides in a clearance hole in plate 24.

Bearing 31 enables retainer 29 to rotate with low resistance about its vertical axis when air pressure obtains to unlock the joint.

Leakage of air through the bearing 31 is prevented by face seal 32 which seals the gap between retainer 29 and plate 24.

Figure 6:
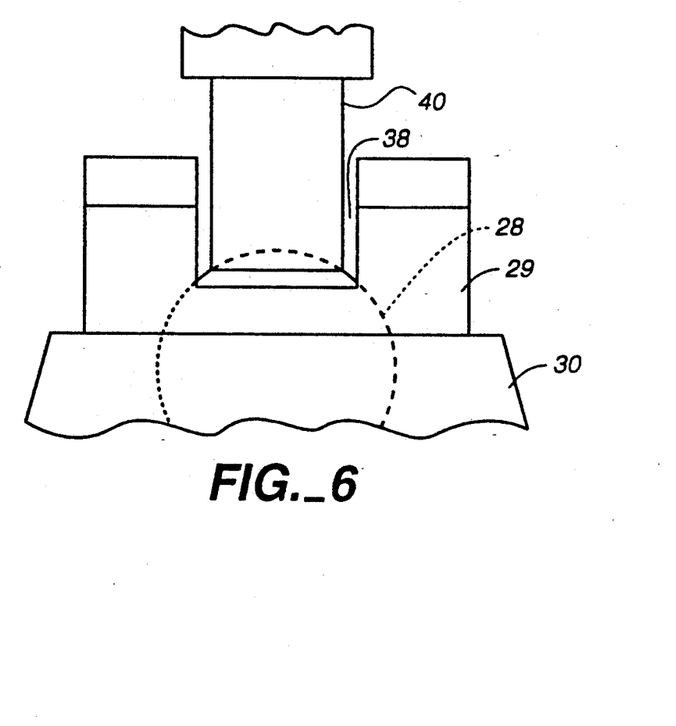
FIG. 6 is a rear view of the top of the first joint showing the ball mount constrained in a vertical slot in the ball retainer.

The cylindrical stem 40 of the ball 28 is flattened on opposite sides and is captured by the slot 38 in retainer 29. This configuration is shown in FIG. 6. Accordingly, as viewed from FIG. 5, the stem of the ball 28 can swivel rightward or leftward about the ball's geometric center in the plane of the drawing, but is constrained by the slot interface to swivel latitudinally in a plane which is perpendicular to the top of the table 2.

Referring again to FIG. 5, the ball stem 40 is attached to an adapter 39 via threaded rod 37. The adapter 39 is attached to the lower end of the first tube 41. Threaded rod 37 contains a hole 43. A bore 42 extends from the lower surface of the ball 28 to the lower end of the threaded rod 37. When air pressure is applied to the first joint, it also is conveyed through the ball via hole 42 and through the threaded rod via hole 43 to flexible tube 44 contained within the tubular section which conducts it to the next joint.

Figure 7:
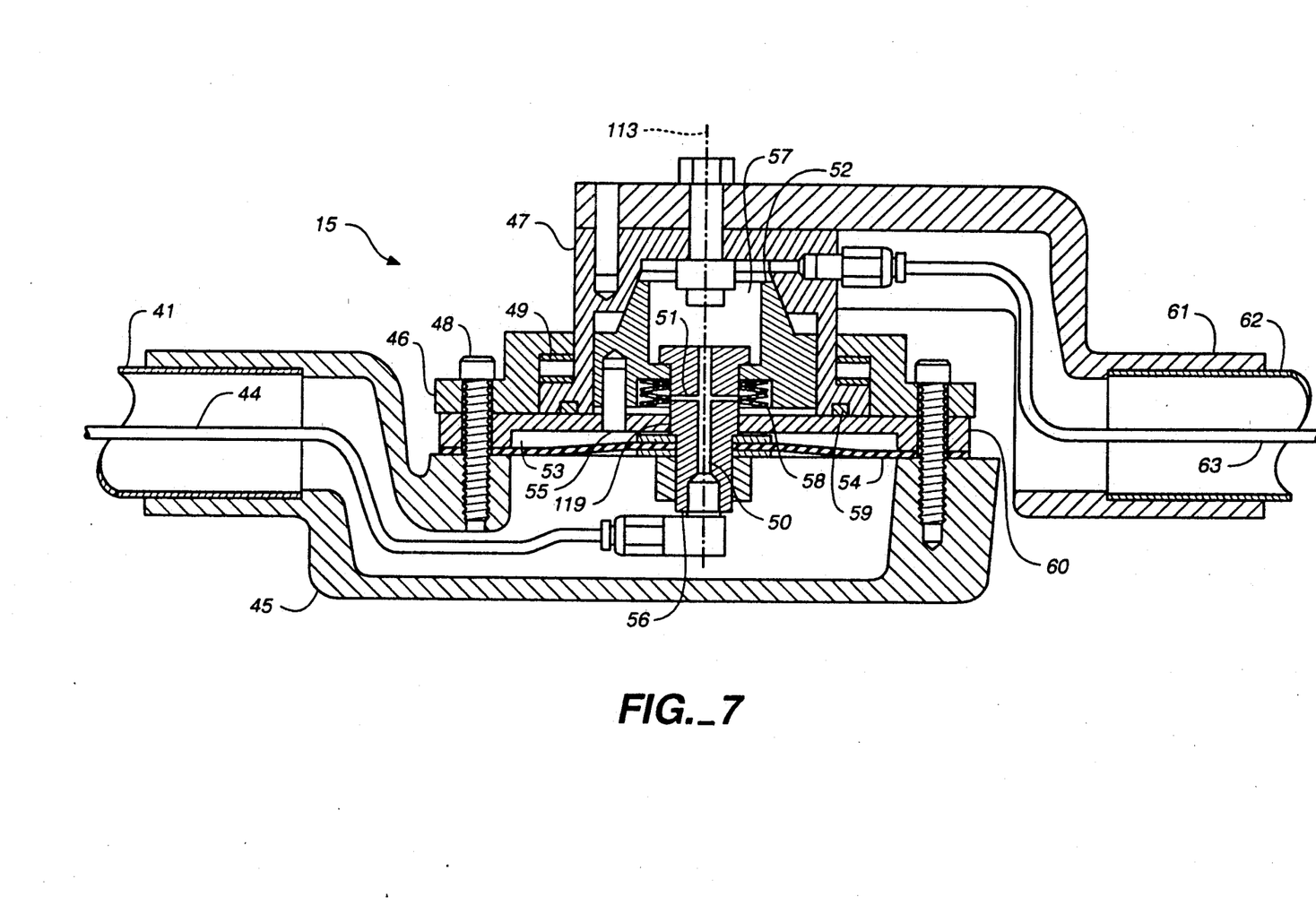
FIG. 7 is a cross section of the second joint.

FIG. 7 is a sectional view of the second joint 15 as indicated by line-of-sight 7a in FIG. 2. Referring to FIG. 7, a piston housing includes a plate 60 and a base section 45 attached to an adjacent end of an elongated section. The lower end of a piston assembly 56 extends through a hole 119 in plate 60 into the cavity 53 formed by plate 60 and base section 45.

The upper end of the piston assembly 52 has a concave surface which is forced against the conical seat of hinging member 47 by spring 58. Piston 52 is prevented from rotating about its centerline by pin 55 which is pressed into the piston and is free to slide in a clearance hole in plate 60.

Hinging member 47 is guided and slidably secured by flange 46 which is attached to base section 45 by screw 48. Adapter 61 is attached to hinging member 47 and the second tube 62. When joint 15 is unlocked, it can swivel about the centerline 113 of hinging member 47.

A diaphragm 54 made from flexible material is positioned between plate 60 and base section 45, thereby defining a plenum 53 between plate 60 and diaphragm 54. The lower piston end 56 is connected to diaphragm 54 so that the diaphragm may pull the piston assembly in a downward direction away from plate 60 and compress spring 58. In operation, air pressure is conveyed to the lower end 56 of piston assembly via flexible tube 44. Air pressure is conducted to the plenum 57 via hole 50 running along the centerline of stud 56. At the same time, air pressure is transmitted through the transverse hole 51 in stud 56 to the plenum occupied by spring 58, thence through the clearance hole 119 for lower piston section 56 in plate 60 to plenum 53 above diaphragm 54. The pressure in plenum 53 forces diaphragm 54 to move in a downward direction away from plate 60 thus compressing spring 58 and disengaging conical surface of piston 52 from its mating seat in hinging member 47. At the same time, air pressure from plenum 57 is conveyed to the third joint via flexible tube 63.

When air pressure is applied to plenum 57 it causes the force between hinging member 47 and its restraining part flange 46 to increase. Bearing 49 reduces the friction between hinging member 47 and flange 46 which is caused by the air pressure force.

Face seal 59 prevents air from escaping from the joint via bearing 49.

Figure 8:
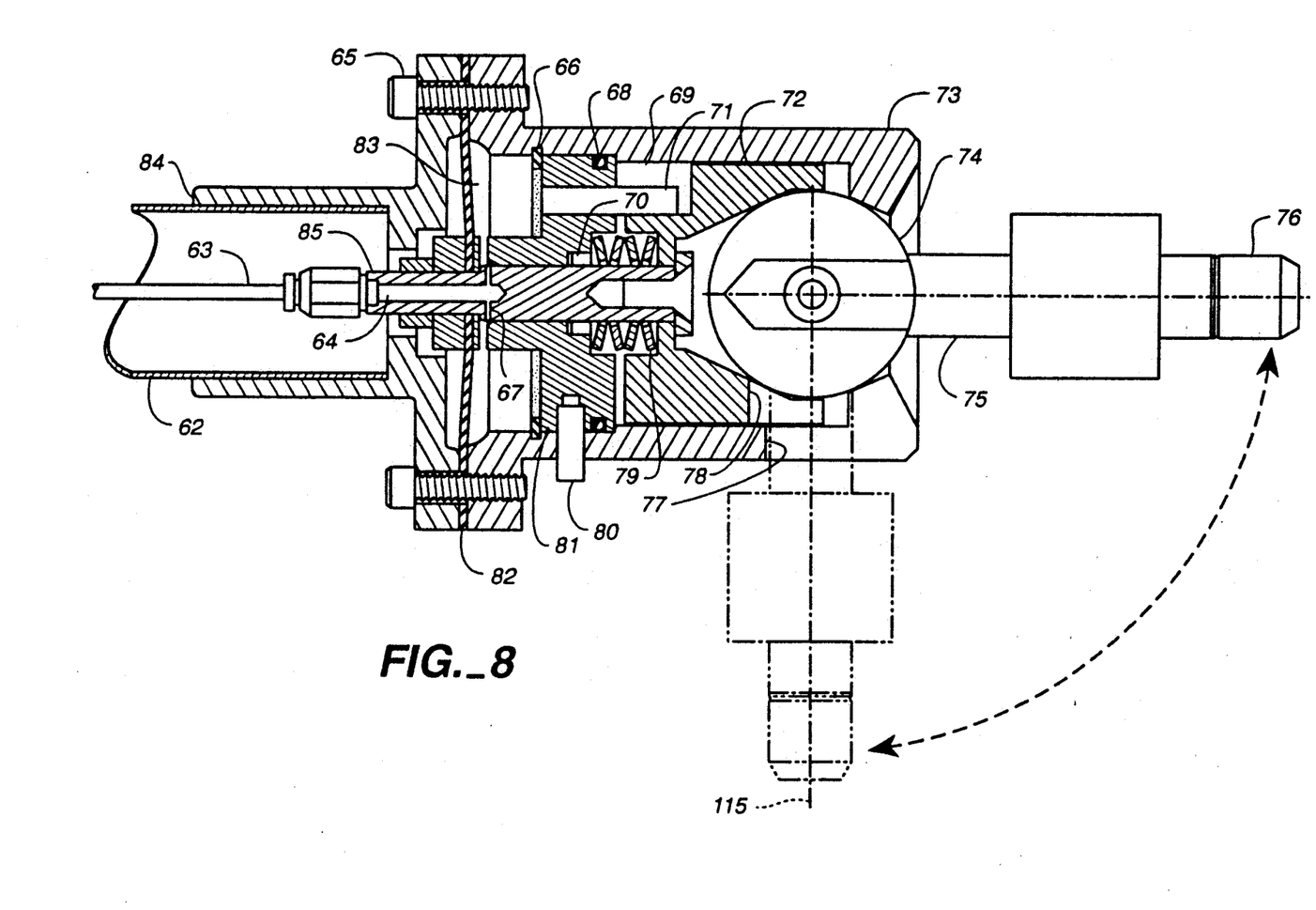
FIG. 8 is a cross section of the third joint.
Figure 9:
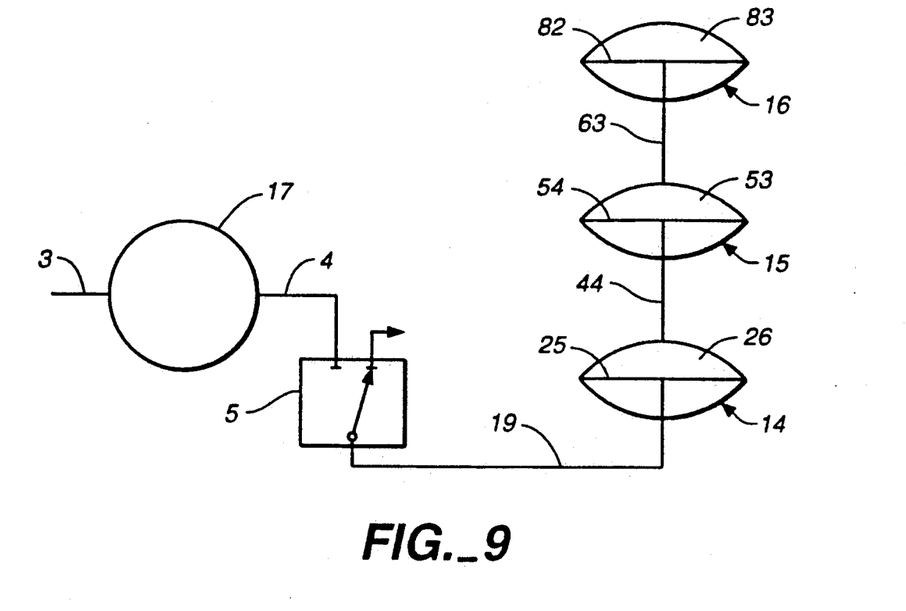
FIG. 9 is a schematic diagram of the pneumatic system for a fixture which unlocks all of the joints at one time at the same air pressure.

FIG. 8 is a longitudinal sectional view of the third joint as indicated by line-of-sight 8a in FIG. 2. Referring to FIG. 8, adapter 84 is attached to the upper end of the second tube 62. The upper concave conical surface of piston assembly 72 is forced against ball 74 by spring 79 thus clamping ball 74 firmly against retainer 73. The piston assembly 72 is prevented from rotating about its centerline by pin 71; said pin being pressed into guide 81 and being free to slide in slot 69 in piston assembly 72. Guide 81 is prevented from rotating in retainer 73 by set screw 80. Accordingly, when air pressure is absent, ball 74 and the parts attached to it including stem 75, and shaft 76, are rigidly locked to the end of the elongated section 62, which is a tube in the preferred embodiment.

Guide 81 is prevented from moving axially (parallel to centerline 114) in retainer 73 by retaining ring 66.

When the operator presses the foot pedal 5, air pressure is conveyed to the first and second joints, and then to the third joint via flexible tube 63 which is contained within the tubular elongated member. Pressure is then conveyed through the body of the stud 85 via longitudinal hole 64 and transverse hole 67 to the cavity 83. Pressure in plenum 83 forces diaphragm 82 to move away from guide 81, thus causing the stud at the lower end 85 of the piston assembly to pull the conical concave surface of the piston assembly 72 away from ball 74 and compressing spring 79 to unlock the joint.

The lower section of the piston assembly, stud 85, is a slip fit in guide 81 and fits loosely to the upper end of the piston assembly 72 to avoid binding. Seal 70 prevents pressure from entering the plenum occupied by ball 74.

Since ball 74 is operating in an unpressurized plenum at all times, it is possible to provide ninety degree orientation of ball stem 75 in one direction by providing slot 77 in retainer 73 and slot 78 in upper piston section 72. by rotation about an axis passing through the center of the ball 74 and which is perpendicular to the axis of the stem 75 and the centerline 114 of the retainer 73. FIG. 8 represents the ninety degree orientation of the stem by showing the stem in one position where the centerline 115 of the stem 75 is almost parallel to the centerline 114 of the retainer 73 and in phantom in a second position where the centerline 115 of the stem 75 is oriented perpendicular to the centerline 114. Stem 75 is further permitted movement of the ball stem 75 to anywhere within a cone with half angle approximately fifteen degrees as shown in FIG. 8.

The three joints shown in FIGS. 5, 7, and 8 are generic to a means for articulating, comprising a base housing enclosing a base cavity. A lower section of a piston assembly protrudes slidably through a hole in the topside of the base housing into the cavity where it is attached to a flexible diaphragm. The periphery of the diaphragm is attached to the wall of the cavity, thereby defining a plenum between the diaphragm and the topside of the base housing. The bottom end of the piston assembly is attached to the diaphragm. The upper end of the piston has a surface conformed to mate with an opposing surface of an orienting means (i.e., ball 28 in FIG. 5, hinging member 47 in FIG. 7, and the ball 74 in FIG. 8). A retainer is rotably attached to the topside of the base housing and has a surface in sliding contact with the orienting means to retain the orienting means in a position adjacent to the mating surface of the piston. The retaining means (29 in FIG. 5, 47 in FIG. 7, and 73 in FIG. 8) has an opening through which the orienting means extends for attachment to an adjacent member (e.g., toolholder 76 in FIG. 8, end of a neighboring section in FIGS. 5 and 7). A spring between the topside of the base housing and the piston assembly forces the piston, orienting means, and retainer together to immobilize the joint in a preset orientation. In order to loosen the joint, the plenum is pressurized by air admitted through the bottomside of the housing, then through a passageway leading from the bottom end of the piston assembly through the piston to an outside surface of the piston, down through a channel defined by the outside wall of the piston with the inside surface of the retainer and the hole in the topside, then into the plenum.

Figure 10:
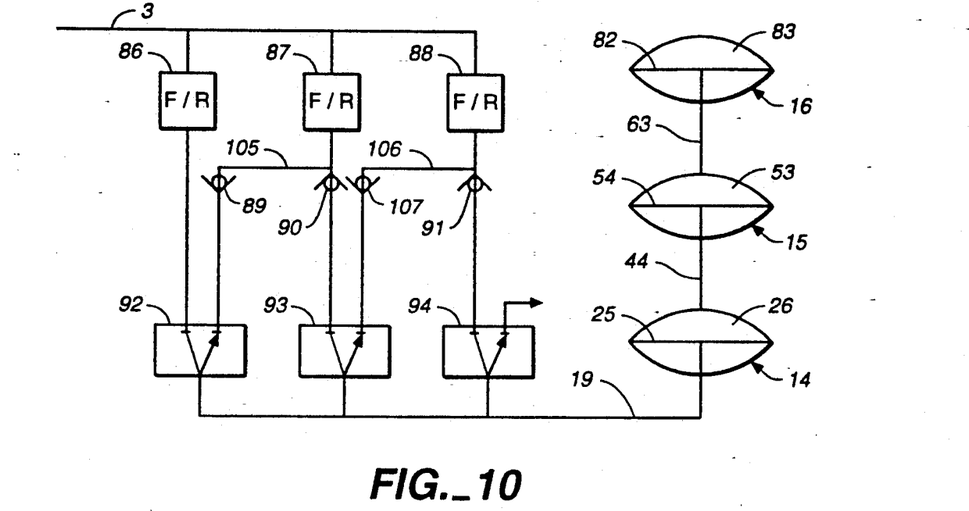
FIG. 10 is a schematic diagram of the pneumatic system which unlocks the joints sequentially starting with the third joint by increasing the air pressure in discrete steps.

FIG. 10 shows a modification of the pneumatic system to make it possible to unlock the joints one at a time beginning with the third joint 16. In this arrangement the springs are selected with a spring stiffness which will allow the air pressure to pull the piston assembly away from its mating part at a pre-set pressure. Spring 79 in joint 16 would be calibrated to release ball 74 at approximately 60 pounds per square inch pressure. Spring 58 in joint 15 would be calibrated to release the hinging member 47 at approximately 80 pounds per square inch pressure. Spring 23 in joint 14 would be calibrated to release ball 28 at approximately 100 pounds per square inch pressure.

Referring to FIG. 10, items 86, 87, and 88 are filter/regulators with a relieving feature which are set at 100, 80, and 60 pounds per square inch respectively. Items 89, 90, 91, and 107 are check valves which are intended to prevent air from flowing backwards into the regulators. Items 92, 93, and 94 are three-way solenoid valves.

Figure 11:
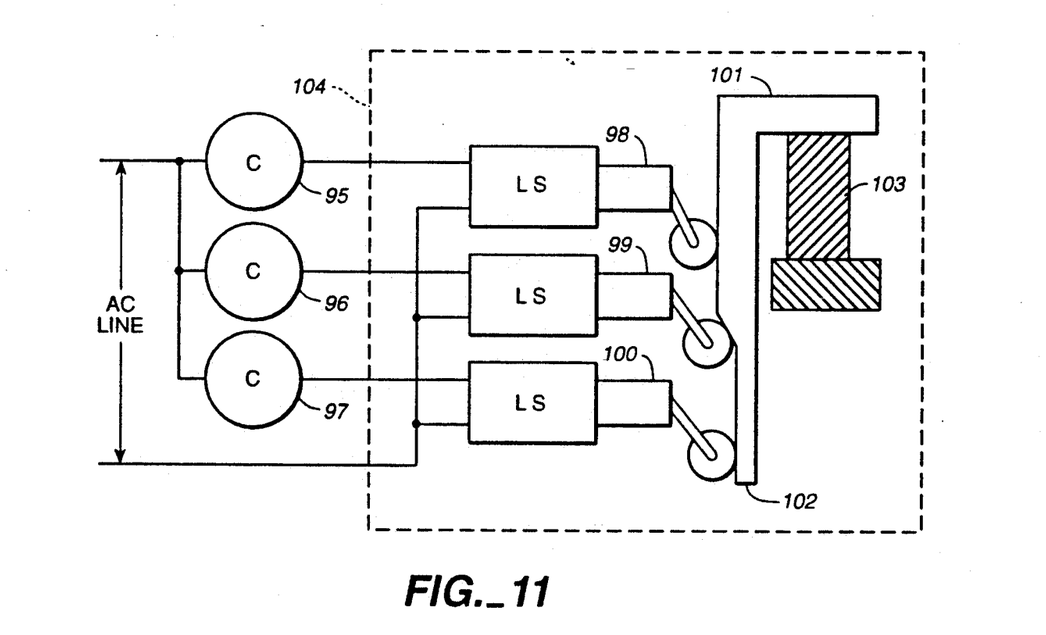
FIG. 11 is a schematic of the electrical control circuit used to control pneumatic valves shown in FIG. 10.

Referring to FIG. 11, items 95, 96, and 97 are the solenoid coils for valves 92, 93, and 94 respectively. Items 98, 99, and 100 are limit switches arranged to be activated by cam 102 which is attached to pedal 101. Spring 103 maintains the cam in the upward position unless the pedal is depressed. Item 104 is the entire foot switch assembly.

In operation, when limit switch 100 is actuated, valve 94 admits air to flexible tube 19 at 60 psi pressure and the third joint 16 is unlocked. If pedal 10 is further depressed, limit switch 99 is actuated and valve 93 admits air to flexible tube 19 at 80 psi pressure and joint 15 is unlocked. Air is prevented from entering regulator 88 by check valve 91. If pedal 101 is depressed to the end of its stroke, limit switch 98 is actuated and valve 92 admits air to flexible tube 19 at 100 psi pressure and joint 14 is unlocked. Air is prevented from entering regulator 87 by check valve 90.

When pedal 101 is released, the joints lock progressively starting with joint 14. When limit switch 100 deactivates it causes valve 92 to deactivate. Valve 92 then disconnects regulator 86 from flexible tube 19 and connects the outlet line via line 105 and check valve 89 to the outlet side of regulator 87, which in turn vents air through its pressure-relieving feature until the pressure in tube 19 falls to 80 psi. Joint 14 is now locked.

When limit switch 99 is deactivated it deactivates valve 93 which disconnects regulator 87 from flexible tube 19 and connects the outlet line via tube 106 and check valve 107 to the outlet side of regulator 88, which in turn vents air through its pressure-relieving feature until the pressure falls to 60 psi. Joints 14 and 15 are now locked.

When limit switch 98 deactivates, it deactivates valve 94 which vents the remainder of the air in tube 19 to atmosphere, thus locking joint 16.

In the foregoing paragraphs, a positioning fixture has been described which meets the objects of this invention. The fixture comprises two elongated tubular sections. Each section has an end articulated to the other. One section has an end adapted for articulation to a work surface and the other section has an end adapted for articulation to a clamp for a work part. The axis of the section articulated to the work surface may be oriented latitudinally or longitudinally with respect to the direction perpendicular to the bench top.

The joint sections allows the section holding the tool holder to be oriented in a plane perpendicular to the work surface. The joint articulating the tool holder to its elongated section is a universal joint that permits rotation and orientation both latitudinally and longitudinally about the axis of the elongated second section.

An important feature of this invention is that the joints may be loosened simultaneously by depression of a foot pedal allowing the operator to conveniently locate and orient the part as required. The joints become "frozen" when the pedal is released.

In an alternate embodiment, the joints may be loosened in succession by increased incremental depression of the foot pedal.

A particular advantage provided by the construction of the articulation between the work surface and end of the adjacent section is that longitudinal rotation of the section (about the axis vertical to the table) is performed by rotation of a flange supported by bearings independent of latitudinal orientation which is accomplished by revolving the ball joint in its socket. Although the same degree of freedom could be provided by a simple ball joint, the flange and ball construction of the present invention provides a greater clamping surface and hence greater clamping force than the simpler construction and is therefore the preferred construction.

An advantage of the slot and ball construction of the table-mounted joint in combination with the rotating flange construction of the joint between elongated sections provides that radial range of the location of the part extends from very close to the base support to the combined lengths of the extended sections.

The two joints discussed in the immediately preceding two paragraphs thereby provide that the part can be placed anywhere over a large area of the table, whereas the joint attaching part to fixture provides for fine "universal" adjustments of location and orientation.

Air lines connecting joints are enclosed in the tubular elongated sections. The air lines are thereby protected from damage caused by weld spatter.

It should be understood that various modifications within the scope of this invention can be made by one of ordinary skill in the art without departing from the spirit thereof.

For example, the fixture may comprise more than two sections in order to allow even more degrees of freedom.

Fixation of the joints can be controlled by a single foot pedal and an air passage communicating with all the joints.

Another variation is the substitution of rigid ram attached to the lower piston section in place of the diaphragm in applications where a large force is required to lock the joint.

I therefore wish my invention to be defined by the scope of the appended claims and in view of the appended claims if need be.

I claim:

1. A positioning fixture for supporting a part holder holding a part in an arbitrary location and orientation on a work surface which comprises:

an elongated structure having a first end, a second end, and a plurality of elongated sections;

a first means for articulating said first end to said work surface;

a second means for articulating said second end to said part holder;

a third means for articulating one end of each said elongated section to a neighboring end of one of said other elongated sections thereby providing that said elongated sections are arranged end to end in succession from said first articulating means to said second articulating means;

an air passage means for providing that said first, second and third articulating means communicate with a source of pressurized air;

said first, second and third articulating means operably constructed to permit that each said articulating means be fixed in an arbitrary position when air pressure is not applied to said articulating means or free for adjustment when air pressure is applied to said articulating means;

said first articulating means comprising:

a base housing enclosing a piston cavity wherein said housing has a topside with a hole and a bottom side with a hole;

a means for connecting said base housing to said work surface;

a piston assembly means having a lower piston section extending slidably through said topside hole operably constructed in combination with said housing for defining a plenum in said cavity which expands when said lower piston section extends further into said cavity and an upper piston section extends from said lower piston section with an upper end having a concave conical surface facing away from said base housing;

means for admitting pressurized air into said plenum causing said plenum to expand and further extend said lower piston section into said cavity;

a ball with a stem and having a spherical surface adjacent to and conforming to said concave conical surface;

a means rotatably mounted on a surface of said topside of said base housing for retaining said ball adjacent to said conical concave surface of said piston assembly means, said retaining means having an inner surface conforming to said spherical surface of said ball and an opening through which said stem protrudes which may be attached to an end of a neighboring one of said elongated members; and a spring means operably positioned with an end in contact with said base housing and another end in compressive contact with said piston means for forcing said concave conical surface against said ball and said ball against said retaining means thereby locking said ball in a desired orientation and further providing that when air pressure is applied in said plenum, said concave conical surface on said upper end of said piston assembly means is forced away from said ball surface thereby permitting said ball and retaining means to be freely oriented when required.

2. A positioning fixture as in claim 1 wherein said second articulating means comprises:

a section housing attached to a neighboring end of said section at said second end of said positioning fixture and enclosing a piston cavity wherein said housing has a topside with a hole and a bottomside with a hole;

a piston assembly means having a lower piston section extending slidably through said topside hole operably constructed in combination with an inside surface of said piston cavity to define a plenum and an upper piston section extending from said lower piston section with an upper end having a concave conical surface facing away from said piston housing;

a ball attached to one end of a stem and having a spherical surface adjacent to and conforming to said upper conical surface of said piston assembly means;

a means rotatably mounted on a surface of said topside of said section housing for retaining said ball adjacent to said upper end surface, said retaining means having an inner surface adjacent to and conforming to said ball and an opening through which said stem protrudes which may be attached to said tool holder;

a spring operably positioned with an end in contact with said piston housing and another end in compressive contact with said piston means operably arranged to force said end surface of said piston assembly against said ball and said ball against said retaining means thereby locking said ball and said retaining means in preset orientations and further providing that, when said air pressure is applied in said plenum, said conical surface of said piston assembly means is forced away from said ball surface, thereby permitting said ball and said retaining means to be freely oriented when required.

3. A positioning fixture as in claim 1 wherein said third articulating means comprises:

a piston housing attachable to said end of said elongated section and enclosing a piston cavity wherein said housing has a topside with a hole and a bottomside with a hole;

a piston assembly means having a lower end section extending slidably through said topside hole operably constructed in combination with an inside surface of said cavity to define a plenum and an upper piston section extending from said lower piston section with an upper end having a convex conical surface facing away from said piston housing;

a hinging means for hinging attachment of said third articulating means to an end of a neighboring end of one of said elongated sections, said hinging means having a first end attached to said neighboring end and a second end rotatably mounted on a surface of said topside of said piston housing, and a concone conical surface conforming to and adjacent to said convex conical surface of said piston assembly means;

a spring having one end in contact with said topside of said piston housing and another end in compressive contact with said piston assembly means operably arranged to force said conical convex surface of said piston means against said conical concave surface of said hinging means, thereby providing that when no air pressure is applied in said plenum, said hinging means is locked in a present orientation and when air pressure is applied in said plenum, said hinging means may be freely rotated on said topside of said piston housing to a desired orientation.

4. A positioning fixture as in claim 1 wherein each of said first, second, and third articulating means comprises:

a base housing enclosing a base cavity wherein said housing has a topside with a hole and a bottomside with a hole;

a piston assembly means having a lower piston section extending slidably through said topside operably constructed in combination with said piston cavity to define a plenum having means to communicate with said air passage means and an upper piston section extending from said lower piston section with an upper end having a contoured surface facing away from said base housing;

an orienting means having one end with a surface facing and shaped to mate with said contoured surface and a means for attachment extending away from said second end;

a means rotatably mounted on a topside of said base housing for retaining said orienting means adjacent to said contoured surface, said retaining means having an inner surface slidably mated to a surface of said orienting means and an opening through which said member of said orienting means protrudes;

a spring operably positioned with an end in contact with said housing and another end in compressive contact with said piston assembly means to force said contoured surface against said mating surface and said orienting means against said retaining means, thereby locking said orienting means and said retaining means in preset orientation and further providing that when air pressure is applied in said plenum, said contoured surface of said piston means is forced away from said mating surface, thereby permitting said orienting means and said retaining means to be freely oriented when required; and said first articulating means comprises means for attaching said base housing to a work surface and means for attaching said protruding member to an end of one of said elongated sections;

said second articulating means comprises means for attaching said base housing to an end of one of said elongated sections and said attaching means to said tool holder;

said third articulating means comprises means for attaching said base housing to an end of one of said elongated sections and said attaching means to a neighboring end of another one of said elongated sections.

5. A positioning fixture as in claim 4 wherein said lower section of said piston assembly means comprises:

a flexible diaphragm having a periphery attached to an inside surface of said cavity, thereby dividing said cavity into a lower region communicating with ambient pressure through said bottomside hole and an upper plenum;

a stud having one end attached to said diaphragm and slidably positioned through said topside hole and having another end attached to said upper piston section;

means for said plenum to communicate with said air passage means;

said diaphragm attached to said upper section of said piston in operable arrangement thereby providing that air pressure applied in said plenum expands said plenum by forcing said diaphragm so as to pull said piston assembly means toward said base housing, thereby releasing said orienting means and retaining means when required.

6. A positioning fixture as in claim 4 wherein each said elongated section is a tube and each piston assembly means has a bottom end surface on an end of said lower piston section and said air passage means comprises;

a first bore extending from said bottom end surface to said surface of said top end of each said piston assembly means;

an air passage by which said first bore communicates with said plenum of said respective piston assembly means;

a second bore extending from each said facing surface through each said orienting means to an upper end surface of said means for attachment thereby providing that said first bore communicates with said second bore;

tubing means suitable for conducting air contained within said elongated tube section and said tubing means having an end connected to an adjacent end of said bores;

said bore end located in said based housing of said first articulating means communicating with said pressurized air source thereby providing that every said articulating means may be released simultaneously when air pressure is applied or fixed simultaneously when air pressure is interrupted.

7. A positioning fixture means as in claim 6 wherein said air passage means between said plenum and said first bore of each said piston assembly means comprises a passage communicating with said first bore intermediate said top and bottom ends of said piston means and extending through said piston means to an outside surface of and along said outside surface of said piston means to said plenum.

8. A positioning fixture as in claim 4 wherein each said spring is less stiff than a corresponding spring in a neighboring articulating means closer to said work surface, and wherein said air passage means further comprises means to incrementally increase said air pressure, thereby providing that operably controlled incremental increases of said air pressure results in successive unlocking of said articulating means beginning with said second articulating means.

9. A positioning system as in claim 4 wherein at least one bearing is interposed between said rotatable retaining means and said topside.

10. A positioning fixture as in claim 1 which further comprises a foot pedal means operably connected for controlling pressurized air supplied by said source of pressurized air.

11. A positioning fixture as in claim 1 wherein said first elongated section has an axis with an end attached to said first articulating means and said first articulating means comprises, in operable combination:
    a means for allowing said axis to be positioned at an arbitrary latitudinal angle with respect to a direction perpendicular to said work surface;
    a means for allowing said axis to be positioned at an arbitrary longitudinal angle about said direction.

12. A positioning fixture as in claim 11 wherein said means for allowing said axis to be positioned at an arbitrary longitudinal angle comprises:
    a base attachable to said work surface and having a flat parallel to said work surface;
    a flange having a flat surface in rotatable sliding contact with said base surface; and
    said means for positioning said axis at said latitudinal angle comprises:
    a ball joint including a ball with a stem supported on said flange and retained by a retaining means;
    said retaining means having a slot through which said stem protrudes wherein said slot is oriented to constrain said stem to be oriented latitudinally.

13. A positioning fixture as in claim 1 wherein said opening in said retaining means is a slot with two opposing edges and said stem has an axis and a flat side in sliding contact with each edge, thereby preventing said stem attached to said ball from rotating.

14. An articulating device which comprises:
    a base housing enclosing a piston cavity wherein said housing has a topside with a hole and a bottomside with a hole;
    a piston assembly means having a lower piston section extending slidably through said topside hole operably constructed in combination with said piston cavity to define a plenum and an upper piston section extending from said lower piston section with an upper end having a concave conical surface facing away from said base housing;
    a ball with a stem and having a spherical surface adjacent to and conforming to said concave conical surface;
    a means rotatably mounted on a surface of said topside of said piston housing for retaining said ball adjacent to said conical concave surface of said piston assembly means, said retaining means having an inner surface conforming to a spherical surface of said ball and an opening through which said stem protrudes;
    a spring operably positioned with an end in contact with said base housing and another end in compressive contact with said piston means operably arranged to force said concave conical surface against said ball and said ball against said retaining means thereby locking said ball and said retaining means in preset orientation and further providing that when air pressure is applied in said plenum, said concave conical surface of said piston assembly means is forced away from said ball surface, thereby permitting said ball and said retaining means to be freely oriented and said stem may be freely oriented with respect to said base housing as desired.

* * * * *